United States Patent [19]

Hakkaku et al.

[11] Patent Number: 5,161,038
[45] Date of Patent: Nov. 3, 1992

[54] APPARATUS FOR READING AND RECORDING INFORMATION OF CHARACTERS, IMAGES, OR THE LIKE.

[75] Inventors: Kunio Hakkaku, Kanagawa; Susumu Tomoda, Ayase; Satosi Morita, Ayase; Akira Masuda, Ayase; Sinji Odagiri, Ayase, all of Japan

[73] Assignee: Fuji Photo Film Co., Ltd., Kanagawa, Japan

[21] Appl. No.: 755,478

[22] Filed: Sep. 5, 1991

[30] Foreign Application Priority Data

Sep. 19, 1990 [JP] Japan ............... 2-249859
Oct. 1, 1990 [JP] Japan ............... 2-263486
Oct. 13, 1990 [JP] Japan ............... 2-274660
Oct. 17, 1990 [JP] Japan ............... 2-278619

[51] Int. Cl.$^5$ .............................. H04N 1/21
[52] U.S. Cl. ........................ 358/496; 358/498
[58] Field of Search ............... 358/496–498, 358/472

[56] References Cited

U.S. PATENT DOCUMENTS 4,953,038  8/1990  Schiebel et al. ............ 358/496
5,040,074  8/1991  Stemmle ..................... 358/496

*Primary Examiner*—Stephen Brinich
*Attorney, Agent, or Firm*—Sughrue, Mion, Zinn, Macpeak & Seas

[57] ABSTRACT

An information reading and recording apparatus typically for use as a copying machine, a printer, or the like includes a reading unit for photoelectrically reading information from a document while the document is being horizontally fed in a first direction, and a recording unit for recording the information read by the reading unit on a recording medium while the recording medium is being fed in a second direction. The reading unit and the recording unit are disposed in upper and lower positions, respectively, and positioned relatively to each other such that the first and second directions extend across each other. The information reading and recording apparatus has a lower cover and an upper cover openably and closably supported on the lower cover, the recording unit being housed in the lower cover and the reading unit being housed in the upper cover.

15 Claims, 14 Drawing Sheets

FIG.1a
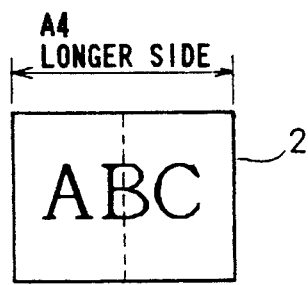
FIG.1b
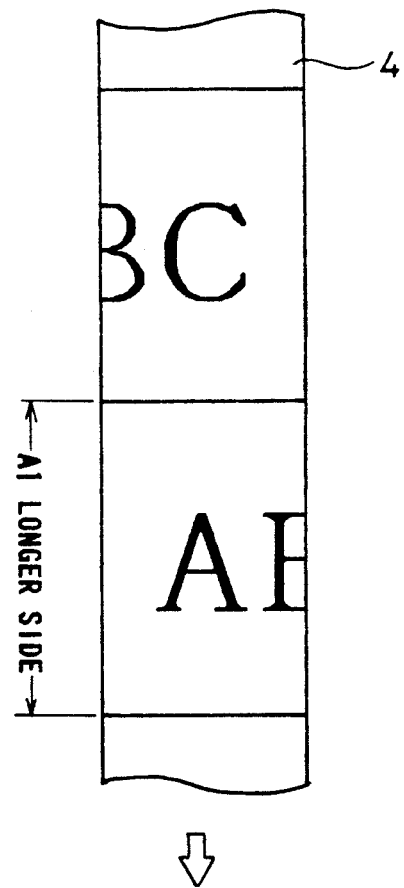

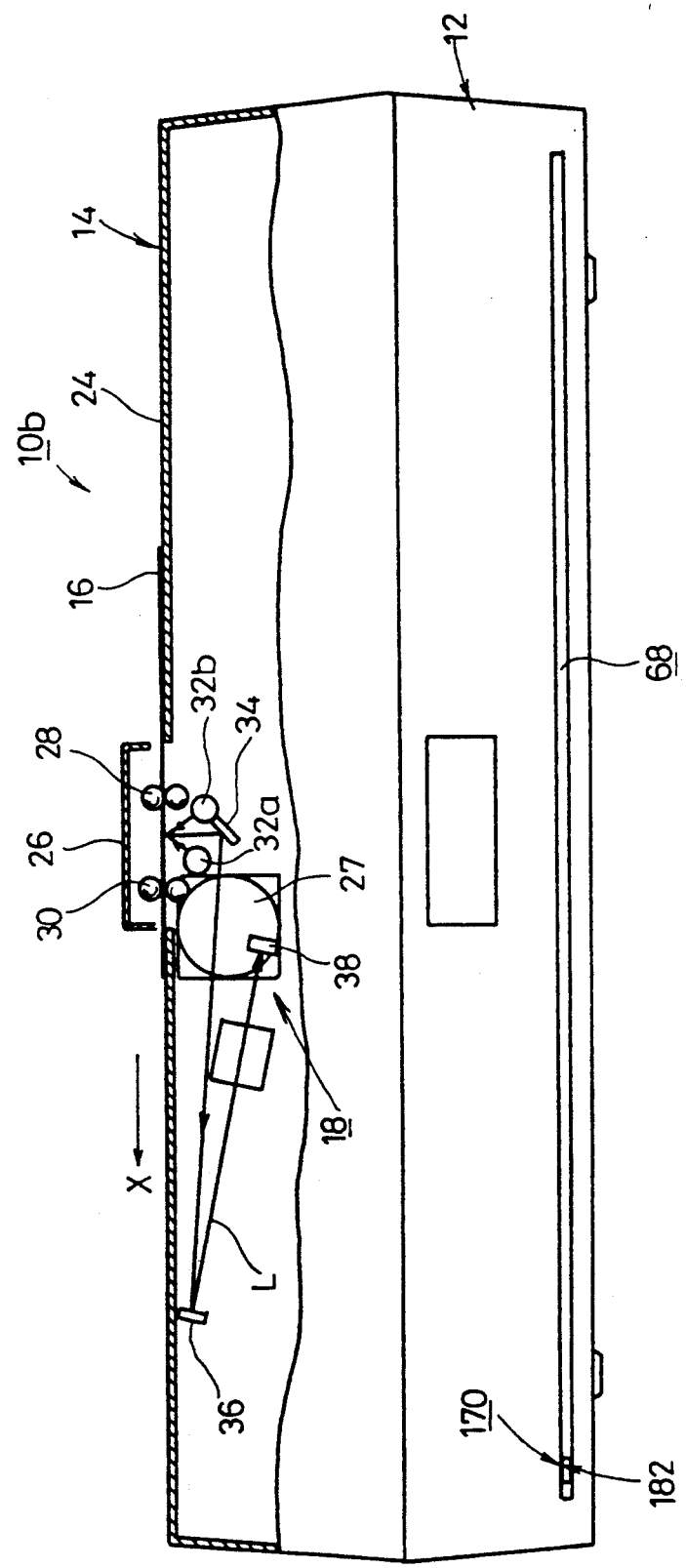

APPARATUS FOR READING AND RECORDING INFORMATION OF CHARACTERS, IMAGES, OR THE LIKE.

BACKGROUND OF THE INVENTION

1. Field of the Invention

The present invention relates to an apparatus for reading information of characters, images, or the like from a document and recording the read information at an enlarged scale on a recording sheet of paper.

2. Description of the Prior Art

When information of characters, images, or the like is read from a document and recorded on a recording sheet of paper in ordinary copying machines, the reproduced information can generally be enlarged up to an A3 size at maximum.

The information contained in some materials and documents to be presented in various meetings and conferences often requires them to be enlarged up to A2 or A0 size. However, the ordinary copying machines are unable to produce duplicates enlarged up to those sizes.

There is known an information reading and recording apparatus that comprises a reading unit for reading information from a document and a recording unit for recording the read information at an enlarged scale on a recording sheet of paper, the reading and recording units being successively positioned along a feed path. While the document and the recording sheet are being fed in the same direction along the feed path, the reading unit reads the information from the document, and the recording unit records the read information on the recording sheet.

Since the reading and recording units are successively positioned, if the read information is to be recorded on an A0-size recording sheet, then the overall length of the information reading and recording apparatus should be large enough to equal to the sum of the length of the A0-size recording sheet and the dimension of the reading unit. As a result, the information reading and recording apparatus is considerably long.

The document that bears information to be copied is introduced into the apparatus from an upper rear side thereof and discharged out of the apparatus from a front lower side thereof. Inasmuch as the document travels along the long feed path interconnecting the upper rear side and front lower side of the apparatus, the document may not be fed accurately along the feed path as it tends to be get jammed or otherwise fail to travel properly.

When the same image on a document is to be reproduced on a plurality of recording sheets, the document has to be removed and inserted into the reading unit each time one recording cycle is finished. The process of recording the image on plural recording sheets is therefore tedious, time-consuming, and inefficient.

There is also known an information reading and recording apparatus having a reading unit for partially reading characters, images, or the like from a document with a line sensor or the like, and a recording unit for recording the read information at an enlarged scale on a recording sheet of paper with a thermal head or the like. The characters, images, or the like that have been read by scanning the document several times with the line scanner are recorded at an enlarged scale on a plurality of recording sheets, which will subsequently be joined together into a desired large size.

For example, as shown in FIGS. 1a and 1b of the accompanying drawings, the information on a half of an A4 size document 2 is read by the reading unit, and then recorded at an A1 size on a recording sheet 4 supplied from a sheet roll. After the document 2 is discharged from the reading unit, the operator sets the document 2 again in the reading unit. Then, the information on the other half of the document 2 is read by the reading unit, and recorded at an A1 size on the recording sheet 4 in an area other than the previously recorded area. Thereafter, the two recorded areas of the recording sheet 4 are cut off and joined into an A0 size, which is an enlarged copy of the document 2.

With the above information reading and recording apparatus, the operator is required to set the document, which has been discharged from the reading unit, again into the reading unit. When the operator sets the document again into the reading unit, the operator may erroneously insert the document upside down, or direct the document with the wrong end ahead, or position the document out of proper alignment, so that the recorded areas may not be joined into a desired enlarged copy. The problem aggravates itself if a fraction 1/N of the entire width N of a document is read in each reading cycle, the document is read N times, the read information is recorded N times on a recording sheet at successive areas, and the recorded areas are joined into an enlarged copy.

A recording sheet such as a heat-sensitive sheet or a thermal transfer sheet is usually stored as a roll. After a desired visible information has been recorded by a thermal head, the recording sheet supplied from the roll is discharged and cut off into a given length by a sheet cutter mechanism.

Available sheet cutter mechanisms are generally classified into manual and automatic sheet cutter mechanisms. The manual sheet cutter mechanism has a cutter movable across the feed path of the recording sheet for cutting off the recording sheet. Since the cutting edge of the cutter repeatedly cuts off the recording sheet, the cutting edge is worn or damaged badly in a relatively short period of time, resulting in relatively frequent cutter replacement. The maintenance of the sheet cutter mechanism is therefore cumbersome and costly.

SUMMARY OF THE INVENTION

It is an object of the present invention to provide an information reading and recording apparatus which is relatively small in size and capable of recording desired information on a large-size recording sheet and of highly accurately feeding a document from which information is to be read.

Another object of the present invention is to provide an information reading and recording apparatus which can efficiently record information, which has been read from a document, on a plurality of recording sheets once the document is placed in a reading position.

Still another object of the present invention is to provide an information reading and recording apparatus which does not require an operator to set a document again in a reading unit, and which can reproduce information, which has been read from a document, at a desired magnification ratio, on a recording sheet supplied from a roll.

Yet another object of the present invention is to provide an information reading and recording apparatus which has a highly durable cutter capable of cutting off a recording sheet efficiently.

According to the present invention, there is provided an apparatus for reading and recording information, comprising a reading unit for photoelectrically reading information from a document while the document is being horizontally fed in a first direction, and a recording unit for recording the information read by the reading unit on a recording medium while the recording medium is being fed in a second direction, the reading unit and the recording unit being disposed in upper and lower positions, respectively.

The reading unit and the recording units are positioned relatively to each other such that the first and second directions extend across each other.

The apparatus further includes a lower cover and an upper cover openably and closably supported on the lower cover, the recording unit being housed in the lower cover and the reading unit being housed in the upper cover, and also a donor film cassette detachably mounted in the lower cover downwardly of the reading unit.

The reading unit comprises feeding means for feeding the document reciprocally in the first direction, and detecting means for detecting leading and/or trailing ends of the document in the first direction. The feeding means has a horizontal feed path along which the document is reciprocally fed. The feeding means comprises a pair of roller pairs spaced from each other in the first direction.

The reading unit comprises means for successively scanning N (N is an integer of 2 or more) areas of the document which are divided in a direction in which the document is scanned across the first direction and which each have a width that is equal to at least 1/N of the width N of the document, while the document is reciprocally fed N times, and for photoelectrically reading information from the scanned areas, further including enlarging means for successively enlarging the information read from the N areas of the document by the reading unit, the recording unit comprising means for recording the enlarged information on the recording medium successively at N areas thereof which are divided in the second direction.

The apparatus further includes a cutter mechanism for cutting off the recording medium, the cutter mechanism comprising a guide surface extending across the second direction and inclined from one end to the other end thereof, a cutter having a cutting edge, the cutter being guidable by the guide surface to cause the cutting edge to move across the second direction for cutting off the recording medium, and holding means for holding the recording medium in position while the cutting edge is cutting off the recording medium.

The cutter mechanism includes a slide base movable across the second direction, the cutter being swingably supported on the slide base, and resilient means for normally urging the cutter to move away from the recording medium.

The cutter mechanism includes a swingable holder, the cutter being fixed to the swingable holder, the holding means comprises a pair of rollers rotatably supported on the swingable holder, the rollers being positioned one on each side of the cutter. The cutter mechanism includes resilient means for normally urging the rollers toward the recording medium.

The above and other objects, features, and advantages of the present invention will become apparent from the following description when taken in conjunction with the accompanying drawings which illustrate preferred embodiments of the present invention by way of example.

BRIEF DESCRIPTION OF THE DRAWINGS

FIGS. 1a and 1b are views showing a conventional process of reading information from a document and recording the read information on a recording sheet;

FIG. 12 is a front elevational view, partly in cross section, of an information reading and recording apparatus according to a third embodiment of the present invention;

DETAILED DESCRIPTION OF THE PREFERRED EMBODIMENTS

Figure 2:
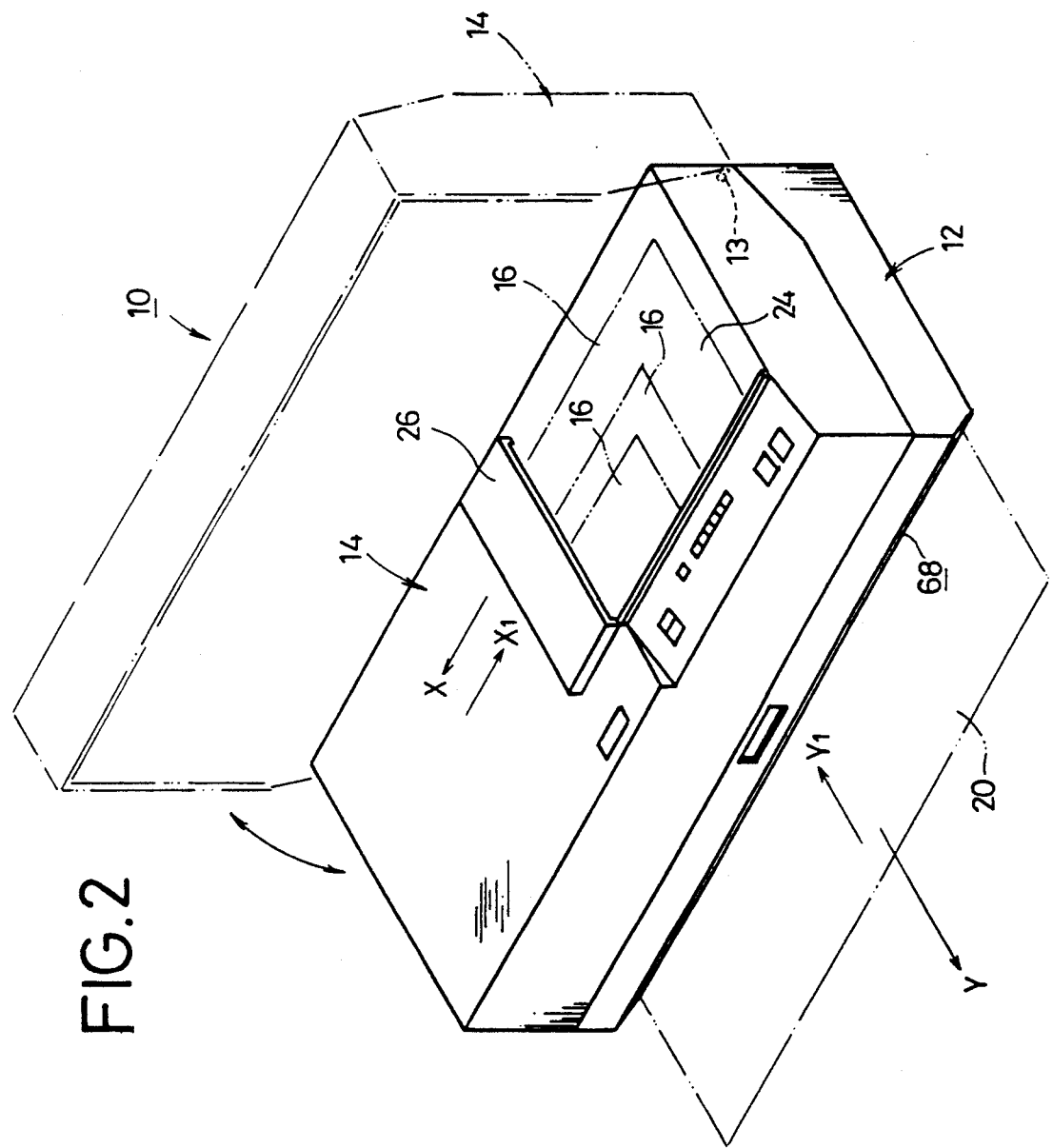
FIG. 2 is a perspective view of an information reading and recording apparatus according to a first embodiment of the present invention.

Like or corresponding parts are denoted by like or corresponding reference characters throughout views.

Figure 3:
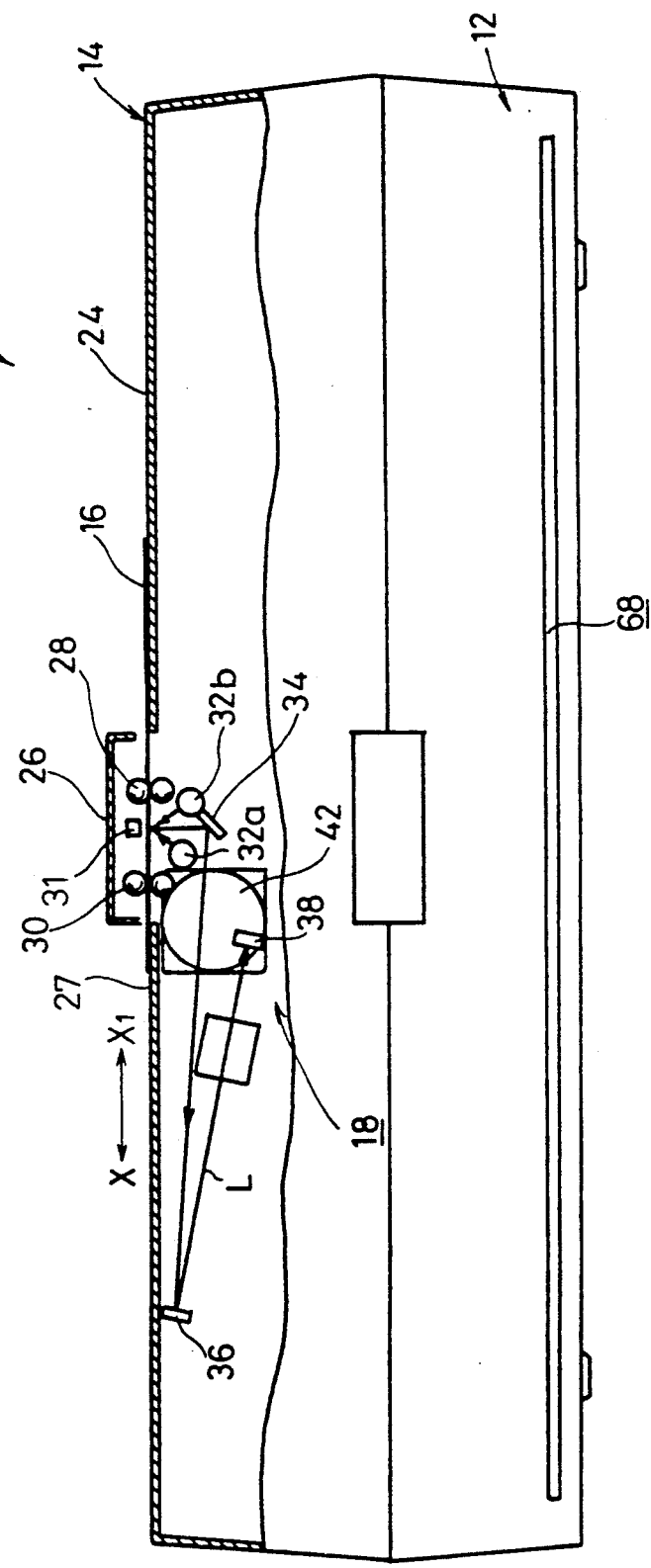
FIG. 3 is a front elevational view, partly in cross section, of the information reading and recording apparatus shown in FIG. 2.
Figure 4:
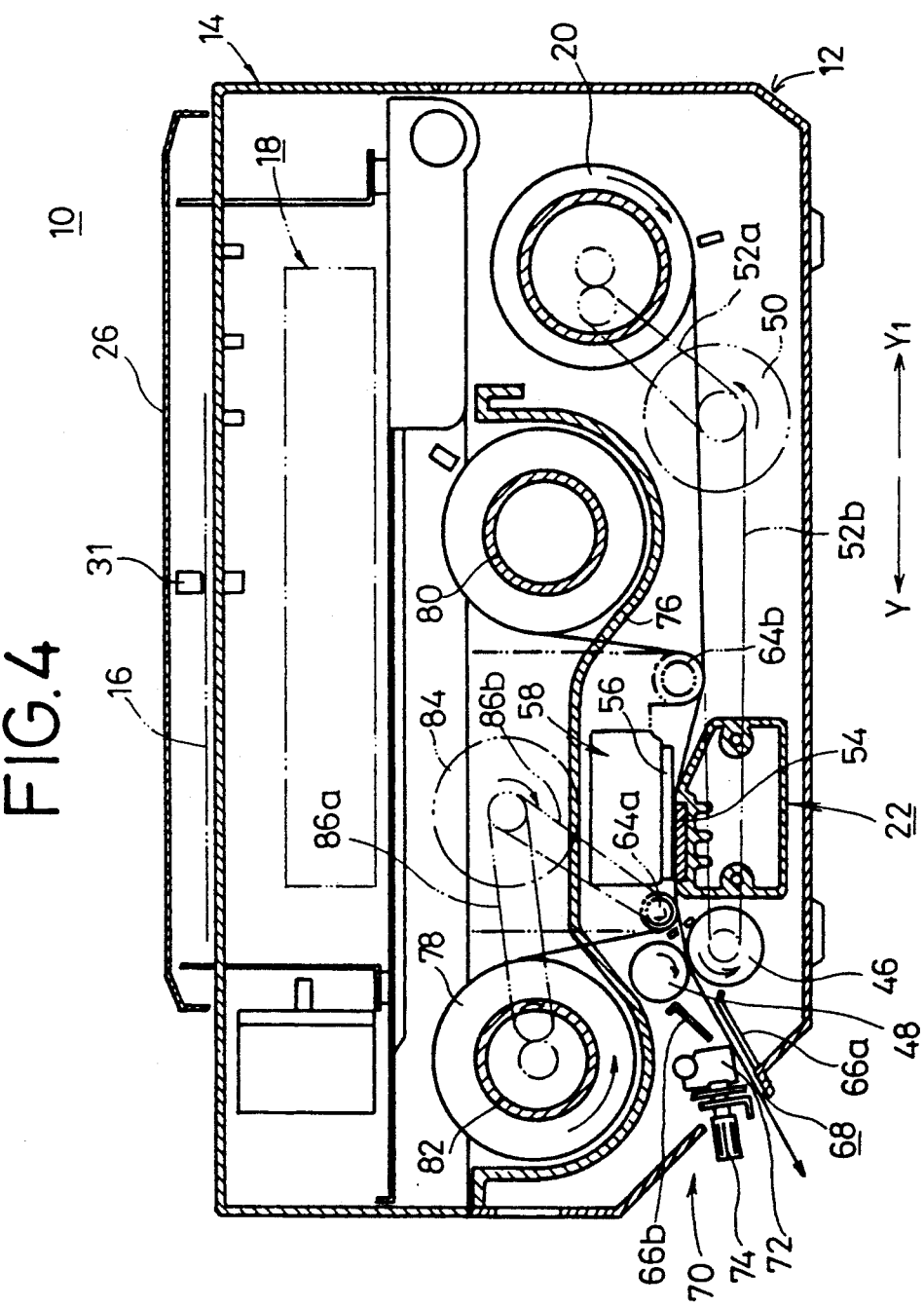
FIG. 4 is a vertical cross-sectional view of the information reading and recording apparatus shown in FIG. 2.

FIGS. 2 through 4 show an information reading and reading apparatus for reading and recording information of characters, images, or the like according to a first embodiment of the present invention.

The information reading and recording apparatus, generally designated by the reference numeral 10, is of a clamshell structure including a lower cover 12 and an upper cover 14 openably and closably coupled to the lower cover 12 by hinges 13. The information reading and recording apparatus 10 has a reading unit 18 disposed in the upper cover 14 for photoelectrically reading information from a document 16 that is being fed horizontally on the upper surface of the upper cover 14, and a recording unit 22 disposed in the lower cover 12 for recording the read information at an enlarged scale on a recording sheet 20 of paper supplied from a sheet roll. The document 16 is fed in the direction indicated by the arrow X (main scanning direction), whereas the recording sheet 20 is fed in the direction indicate by the arrow Y (auxiliary scanning direction), the directions X, Y being transverse to each other.

The upper cover 14 has a document support area 24 on its upper surface. When the document 16 is placed on the document support area 24, an end of the document 16 enters a scanner cover 26 that is mounted on the upper cover As shown in FIG. 3, the reading unit 18 includes a motor 42, which serves as an auxiliary scanning feed means, for moving the document 16 back and forth along a horizontal feed path 27 on the upper cover 14, two roller pairs 28, 30 disposed in the scanner cover 26 and spaced from each other along the horizontal feed path 27, the roller pairs 28, 30 being drivable by the motor 42, and a sensor 31 disposed in the roller pairs 28, 30 for detecting the position of the document 16.

The sensor 31 comprises a reflective photosensor composed of a light-emitting element and a light-detecting element, and detects leading and trailing ends of the document 16 in the feed path 27.

The reading unit 18 also includes light sources 32a, 32b for applying light to the information-bearing surface, surface of the upper cover 14. The light sources 32a, 32b are of an elongate configuration extending in the main scanning direction indicated by the arrow Y which extends perpendicularly to the auxiliary scanning direction indicated by the arrow X. Light L emitted from the light sources 32a, 32b and reflected by the document 16 is reflected by reflecting mirrors 34, 36 toward a CCD sensor 38.

As shown in FIG. 4, the recording sheet roll 20, which is in the form of a thermal transfer sheet roll, is accommodated in the lower cover 12. A leading end of the recording sheet 20 is drawn into the recording unit 22 in which it is gripped between a feed roller 46 and a nip roller 48. The feed roller 46 can be rotated in synchronism with roller pairs 28, 30 of the reading unit 18, by a motor 50 through a timing belt 52b, for thereby feeding the recording sheet 20 from the roll 20 as it rotates clockwise.

Only when the document 16 is repeatedly scanned for multicolor recording, the recording sheet 20 can be fed back in the direction indicated by the arrow Y1 by rotating the roll 20 counterclockwise with the motor 50 through a timing belt 52a and a one-way clutch and a slip coupling mechanism (not shown).

Figure 5:
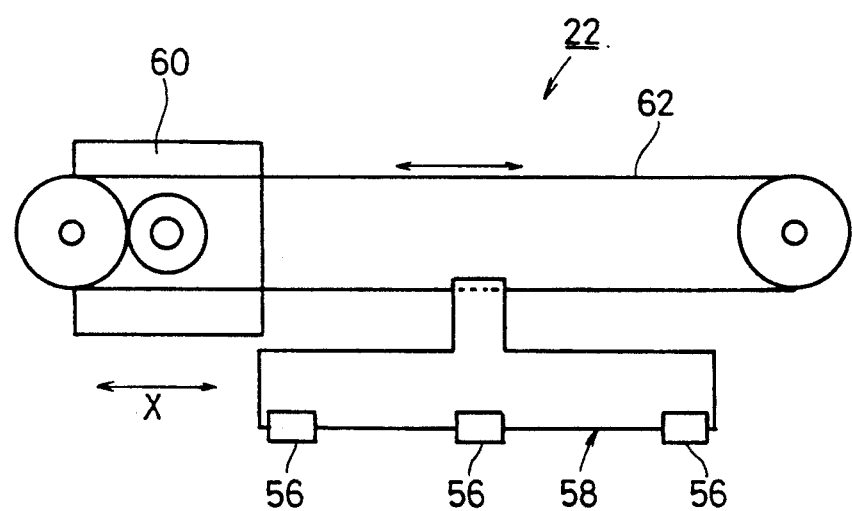
FIG. 5 is a schematic view of a recording unit of the information reading and recording apparatus shown in FIG. 2.

The recording unit 22 has a flat platen 54 and a plurality of thermal heads 56 disposed upwardly of the flat platen 54. As show in FIG. 5, there are three thermal heads 56 mounted on a shuttle unit 58 which is fixed to a timing belt 62 coupled to a motor 60 and is movable back and forth in the direction X. The shuttle unit 58, the motor 60, and donor feed rollers 64a, 64b are supported by the upper cover 14.

Two spaced guide plates 66a, 66b have ends disposed closely to the feed roller 46 and the nip roller 48, and other ends directed toward a recording sheet discharge slot 68 defined in a lower portion of the lower cover 12. In the recording sheet discharge slot 68, there is disposed a sheet cutter mechanism 70 for cutting off the recording sheet 20 into a desired length. The sheet cutter mechanism 70 comprises a guide rail 72 extending in the direction X and a cutter 74 movable along the guide rail 72.

A roll 78 of donor film housed in a cassette 76 is positioned upwardly of the recording unit 22. The donor film 78 is wound around a supply bobbin 80 and a takeup bobbin 82. The takeup bobbin 82 and and donor feed roller 64a can be rotated by a motor 84 through respective timing belts 86a, 86b and slip coupling mechanisms (not shown).

Figure 6A:
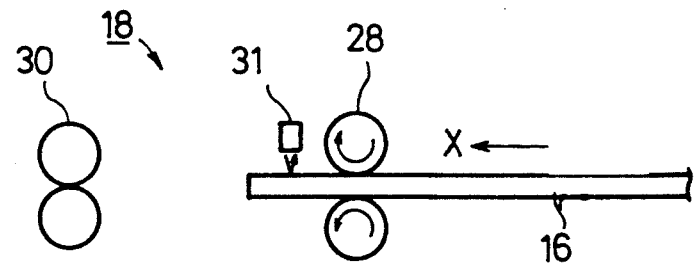
FIGS. 6a, 6b, and 6c are schematic views illustrative of an operation sequence of the information reading and recording apparatus shown in FIG. 2.

The information reading and recording apparatus of the above structure operates as follows:

After a document 16 of desired size is placed on the document support area 24 of the upper cover 14, the reading unit 18 is actuated. The motor 42 is energized to rotate the roller pair 28 in the directions indicated by the arrows to feed the document 16 in the auxiliary scanning direction X until the leading end of the document 16 is detected by the sensor 31 (see FIG. 6a).

Figure 6B:
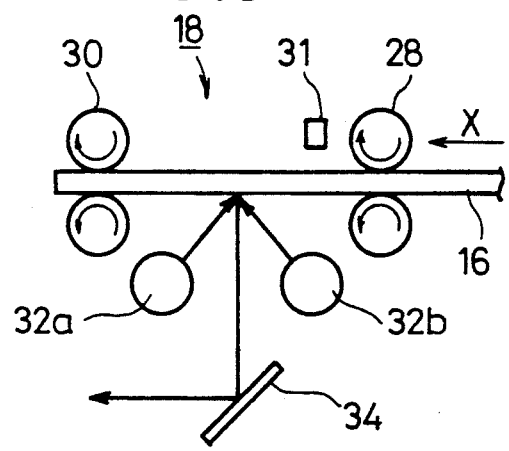

The light sources 32a, 32b are then energized to apply light to the information-bearing surface of the document 16 while the document 16 is being fed in the auxiliary scanning direction X by the motor 42 through the roller pairs 28, 30 (see FIG. 6b).

Light L that is reflected by the information bearing surface of the document 16 is reflected by the reflecting mirrors 34, 36 and applied to the CCD sensor 38. The CCD sensor 38 photoelectrically converts the reflected light into an electric information signal.

The electric information signal is supplied to the recording unit 22, which is actuated. The motor 50 is energized to feed the recording sheet 20 in the direction Y, and the motor 60 is also energized to move the shuttle unit 58 in the direction X through the timing belt 62. The recording sheet 20 and the donor film 78 are pressed against each other between the thermal heads 56 and the platen 54. The desired information, which is represented by the electric information signal supplied to the recording unit 22, is now recorded as visible characters, images, or the like on the recording sheet 20 by the thermal heads 56 and the donor film 78.

The donor film 78 is continuously supplied from the supply bobbin 80 by the motor 84 that rotates the takeup roll 82 and the donor feed roller 64a.

After the information has been recorded on the recording sheet 20, the recording sheet 20 is fed between the guide plates 66a, 66b by the feed roller 46 and the nip roller 48 and discharged out of the discharge slot 68 in the lower cover 12. When the recording sheet 20 is discharged by a desired length, the operator moves the cutter 74 along the guide rail 72 thereby cutting off the recording sheet 20.

Figure 6C:
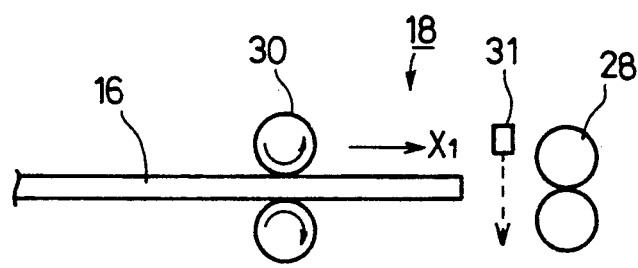

When the trailing end of the document 16 as it moves in the auxiliary scanning direction X is detected by the sensor 31, the motor 42 is rotated in the reverse direction to move the document 16 back in the direction X1 through the roller pairs 30, 28 (see FIG. 6c). Upon detection of the leading end of the document 16 with the sensor 31, the document 16 is positioned in readiness for another reading cycle.

Then, the document 16 starts again being read by the reading unit 18 while being fed in the auxiliary scanning direction X. The information of the document 16 is photoelectrically read again, and then recorded as visible characters, images, or the like on the recording sheet 20 by the recording unit 22.

The above cycle of reading and recording the information of the document 16 is repeated as many times as desired to reproduce the information on a desired number of cut recording sheets 20.

Since the reading unit 18 and the recording unit 22 are disposed in upper and lower positions, respectively, the full length of the information reading and recording apparatus 10 is minimized. Even when a recording sheet 20 of a large size (e.g., A0 size) is used, the information reading and recording apparatus 10 remains relatively small in size because the full length thereof may substantially correspond to the dimension of the recording sheet 20.

The direction X in which the document 16 is fed and the direction Y in which the recording sheet 20 is fed extend across each other. The document 16 can be fed horizontally highly accurately without a jam or feed failure. Inasmuch as the document 16 is placed on the upper surface of the upper cover 14, any trays for inserting a document and receiving a discharged document are not required.

The information reading and recording apparatus is of the clamshell structure which is composed of the lower cover 12 and the upper cover 14 which is openably and closably hinged thereto. The donor film 78 can be replaced and the recording sheet 20 can be loaded easily and efficiently simply by angularly moving the upper cover 14 with respect to the lower cover 12. Specifically, when the upper cover 14 is angularly moved upwardly, the shuttle unit 58, the motor 60, and the donor feed rollers 64a, 64b of the recording unit 22 are also angularly moved with the upper cover 14, allowing the cassette 76 to be removed easily from the lower cover 12.

Furthermore, when the information borne by a document 16 is to be recorded on a plurality of recording sheets 20, it is not necessary to place the document 16 on the document support area 24 each time a reading-/recording cycle is initiated. More specifically, the document 16 placed on the document support area 24 is fed back and forth in the directions X, Xl by the roller pairs 28, 30, and the document 16 is automatically read by the reading unit 18 as many times as described. Consequently, the information of a single document 16 can efficiently and automatically recorded on a plurality of recording sheets 20.

Since the leading and trailing ends of the document 16 are detected by the sensor 31, the document 16 can be positioned in a position to start reading the document 16 in each reading cycle. As a result, the process of reading the document 16 is carried out accurately in each reading cycle.

The document 16 is held by at least one of the roller pairs 28, 30, and fed along the horizontal feed path 27. The document 16 is therefore not accidentally displaced out of positional alignment, and can be read accurately without errors.

While the recording sheet 20 has been described as a thermal transfer sheet, it may be a heat-sensitive sheet. If a heat-sensitive sheet is used as the recording sheet 20, the donor film 78 is unnecessary, and the donor film 78 and the cassette 76 may be detached from the lower cover 12.

Figure 7:
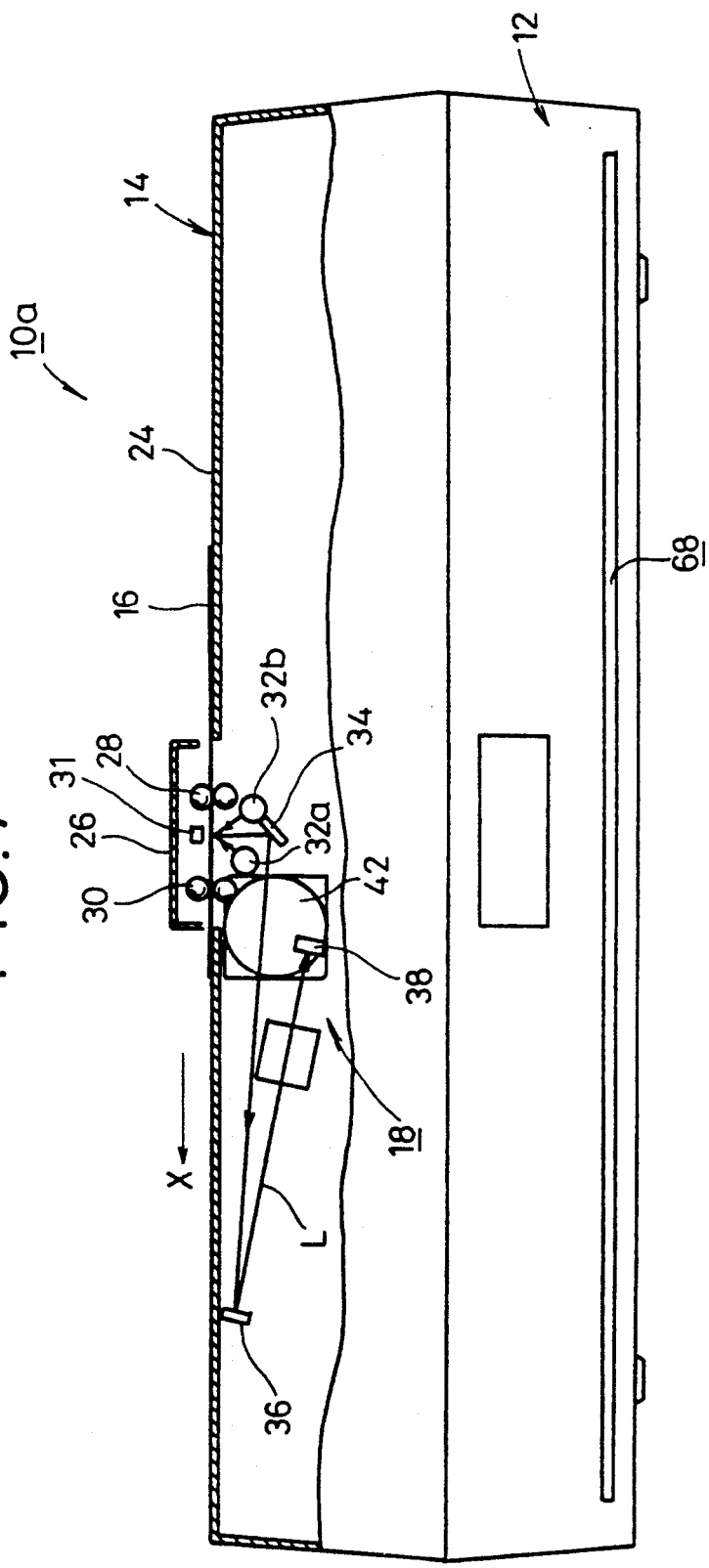
FIG. 7 is a front elevational view, partly in cross section, of an information reading and recording apparatus according to a second embodiment of the present invention.
Figure 8:
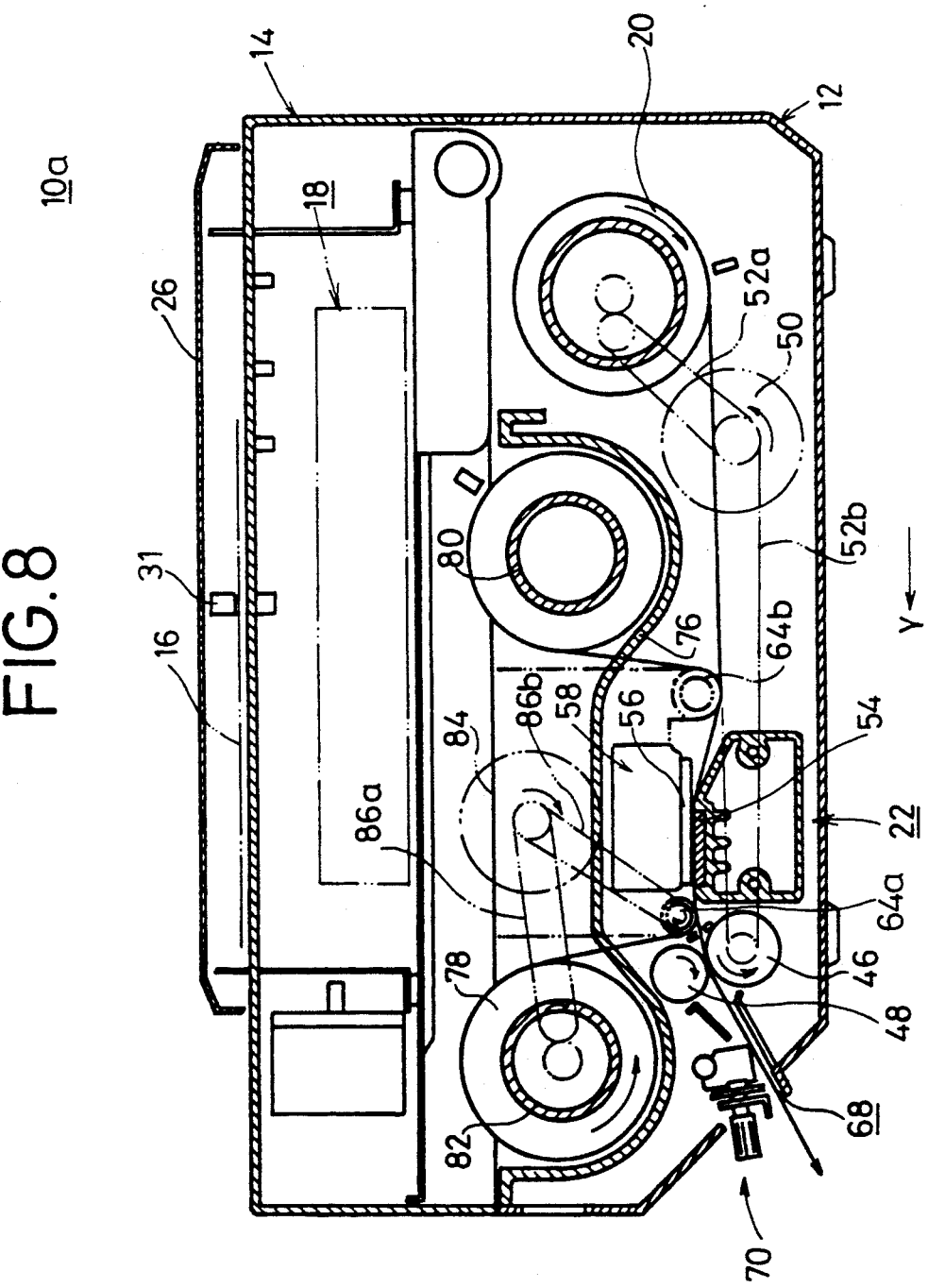
FIG. 8 is a vertical cross-sectional view of the information reading and recording apparatus shown in FIG. 7.

FIGS. 7 and 8 show an information reading and recording apparatus, generally designated by the reference numeral 10a, according to a second embodiment of the present invention.

The mechanical arrangement of the information reading and recording apparatus shown in FIGS. 7 and 8 is basically identical to that of the information reading and recording apparatus according to the first embodiment of the present invention.

Figure 9:
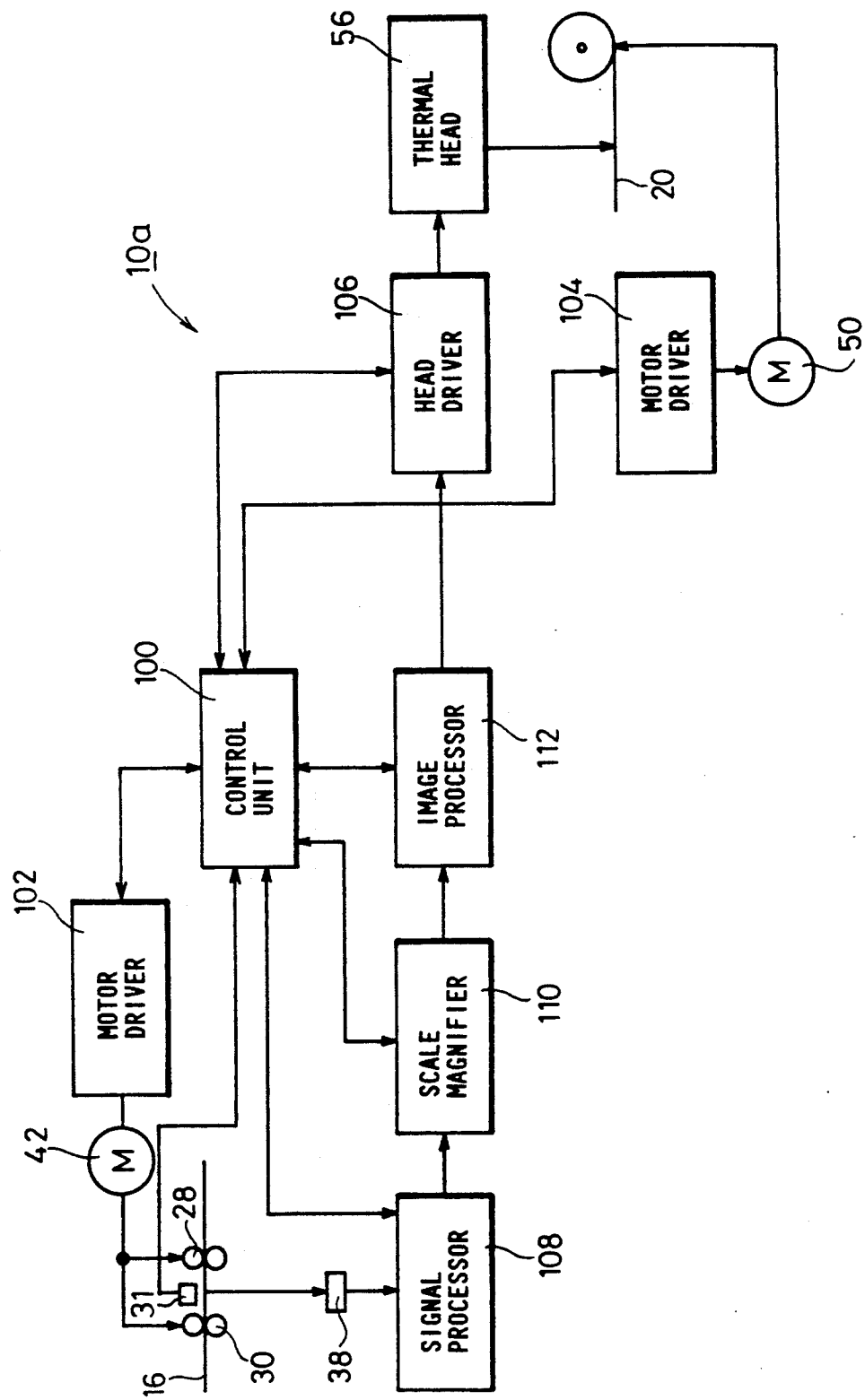
FIG. 9 is a block diagram of a control circuit FIG. 7.

FIG. 9 shows in block form a control circuit for controlling the operation of the information reading and recording apparatus shown in FIGS. 7 and 8.

The control circuit shown in FIG. 9 is controlled by a control unit 100. To the control unit 100, there are electrically connected a motor driver 102 for driving the motor 42, a motor driver 104 for driving the motor 50, and a head driver 106 for driving the thermal head 56.

The sensor 31 of the reading unit 18 is electrically connected to the control unit 100, for supplying a signal, indicative of the detected leading end of the document 16, to the control unit 100. A signal processor 108 controlled by the control unit 100 is electrically connected to the CCD sensor 38. The signal processor 108 converts the information read by the CCD sensor 38 into an electric digital signal.

The signal processor 108 is electrically connected to a scale magnifier 110 which interpolates or otherwise processes the digital signal from the signal processor 108, thereby generating an information signal that represents enough data for producing enlarged characters, images, or the like.

The scale magnifier 110 is electrically connected to an image processor 112 which processes the information signal from the scale magnifier 110 for sharpness, color adjustment, or the like. The processed signal is supplied from the image processor 112 to the head driver 106.

Figure 10:
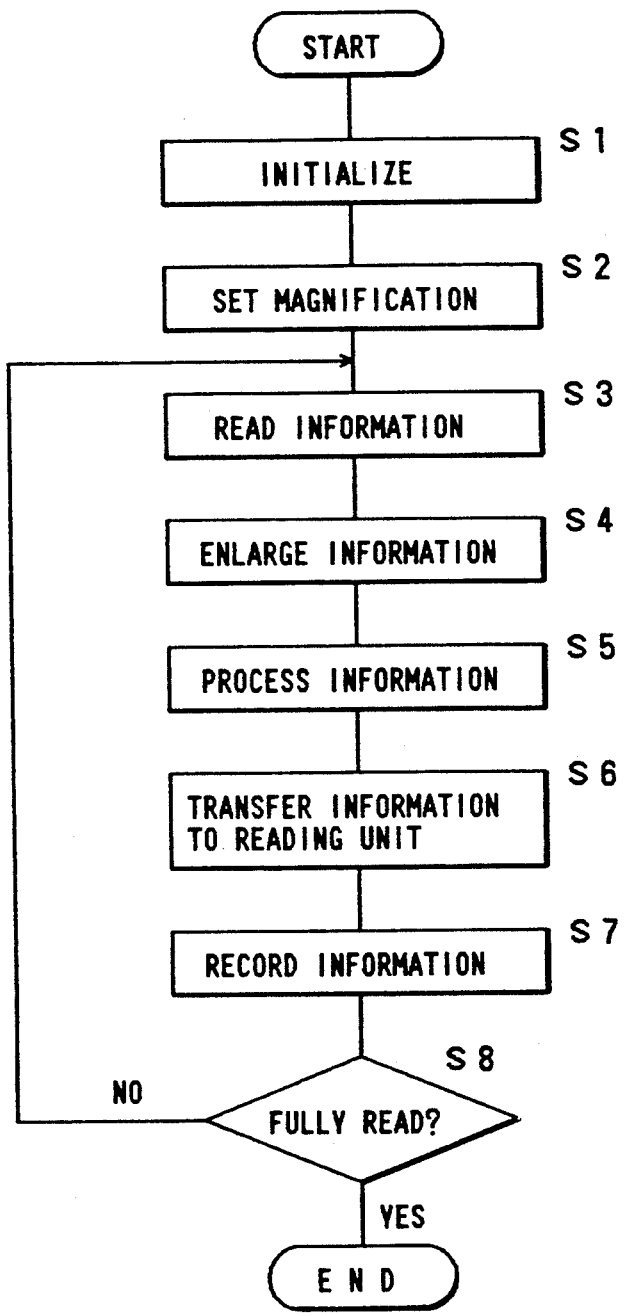
FIG. 10 is a flowchart of a control sequence carried out by the control circuit shown in FIG. 9.
Figure 11A:
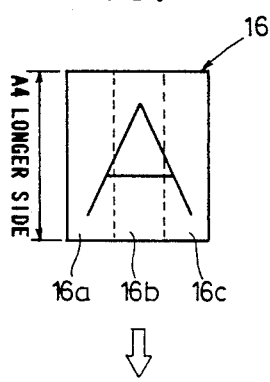
FIG. 11a is a view showing information on a document to be read by the information reading and recording apparatus shown in FIG. 7.

An operation sequence of the information reading and recording apparatus 10a will now be described with reference to FIGS. 10, 11a, and 10b.

It is assumed that the document 16 to be read by the reading unit 18 is of an A4 size, and the recording sheet 20 has a width equal to the shorter side of an A0 size, and that the area of the document 16 is enlarged to an area which is nine times the A4 size.

First, the information reading and recording apparatus 10a is initialized in a step S1. Then, the magnification N at which the information borne by the document 16 is to be enlarged on the recording sheet 20 is set to N=3 in a step S2.

Thereafter, the A4-size document 16 is placed on the document support area 24 with its longer side extending in the auxiliary scanning direction X (see FIG. 11a), after which the reading unit 18 is actuated. More specifically, the motor 42 is energized to rotate in the normal direction by the motor driver 102 for thereby enabling the roller pairs 28, 30 to feed the document 16 in the auxiliary scanning direction X. When the leading end of the document 16 is detected by the sensor 31 that is located between the roller pairs 28, 30, the detected signal is supplied from the sensor 31 to the control unit 100. The control unit 100 energizes the light sources 32a, 32b to cause them to apply light to the document 16, whereupon the information on the document 16 starts being read in a step S3.

The light L reflected by the information-bearing surface of the document 16 is reflected by the reflecting mirrors 34, 36 and applied to the CCD sensor 38. The CCD sensor 38 scans the information on the document 16 in the main scanning direction Y. At this time, the CCD sensor 38 reads the information from an area 16a (FIG. 11a) of the document 16, which is of 1/N=⅓ of the width of the document 16 in the main scanning direction Y, and converts the read information into an electric information signal.

The electric information signal from CCD sensor 38 is converted by the signal processor 108 into a digital signal, which is then interpolated or otherwise processed by the scale magnifier 110 for enlarging the information until the width of the shorter side of the area 16a is equalized to the width of the shorter side of the A0 size, in a step S4.

The image processor 112 then processes the signal from the scale magnifier 110 as desired in a step S5, and supplies the processed signal to the head river 106 of the recording unit 22 in a step S6. The head driver 106 then drives the thermal head 56 to heat the donor film 78 for transferring the information onto the recording sheet 20 in a step S7. At this time, the information recorded on the recording sheet 20 at an area 20a (FIG. 11b) thereof with the shorter side of the area 16a of the document 16 corresponding to the width of the recording sheet 20, as shown in FIG. 11b.

After the area 16a of the document 16 has ben read, since the document 16 is not fully read yet in a step S8, the control unit 100 controls the motor driver 102 to drive the motor 42 to rotate in the reverse direction for thereby feeding the document 16 back to the document support area 24 until the leading end of the document 16 is detected by the sensor 31. Then, an area 16b, adjacent to the area 16a, of the document 16 is read, and the read information is recorded on the recording sheet 20 at an area 20b thereof adjacent to the area 20a in the steps S3 through S7. Likewise, an area 16c of the document 16 is read, and the read information is recorded on the recording sheet 20 at an area 20c in the steps S3 through S7.

The document 16 is automatically fed back to the document support area 24 by the roller pairs 28, 30 that are rotated by the motor 42 which is controlled on the basis of the detected signal from the sensor 31. Therefore, the document 16 can be positioned on the document support area 24 more accurately than with the conventional process in which the document is manually set on the document support area.

Figure 11B:
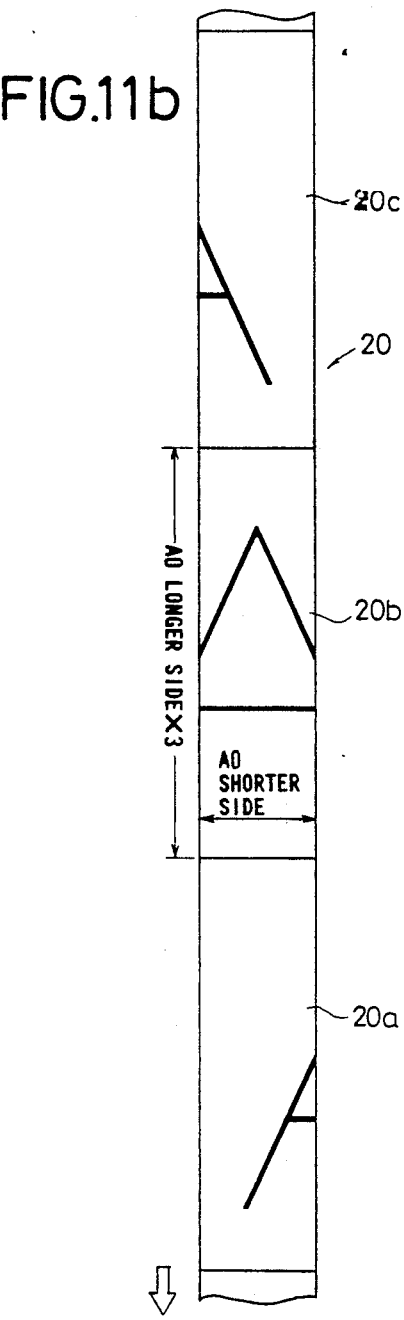
FIG. 11b is a view showing information recorded on a recording sheet by the information reading and recording apparatus shown in FIG. 7.

After the document 16 has fully been read and the information thereof has been recorded on the recording sheet 20 as shown in FIG. 11b, the areas 20a, 20b, 20c the recording sheet 20 are cut off and joined side by side. The joined areas 20a, 20b, 20c form a recorded sheet whose area is nine times the area of the A0 size.

When the document 16 is read successively in N areas that are divided in the main scanning direction, the information borne by the document 16 can be recorded on a sheet area which is $N^2$ times the area of the A0 size within the length of the recording sheet 20 in the auxiliary scanning direction. At this time, the information read from the document 16 is interpolated or otherwise processed by the scale magnifier 110 so that sufficient information is available for enlarged characters, images, or the like.

If the areas 16a, 16b, 16c of the document 16 are read in an overlapping fashion, then the areas 20a, 20b, 20c of the recording sheet 20 can easily be joined side by side because these areas 20a, 20b, 20c have overlapping information and can be joined overlappingly.

In the second embodiment, the document 16 is divided into a plurality of areas in the auxiliary scanning direction and the information read from each of the divided areas is recorded on the recording sheet 20. However, the document 16 may be divided into a plurality of areas in the main scanning direction, and the information read from each of the divided areas may be recorded on the recording sheet 20 at a desired magnification ratio.

An information reading and recording apparatus according to a third embodiment of the present invention will be described below with reference to FIGS. 12 through 15.

Figure 13:
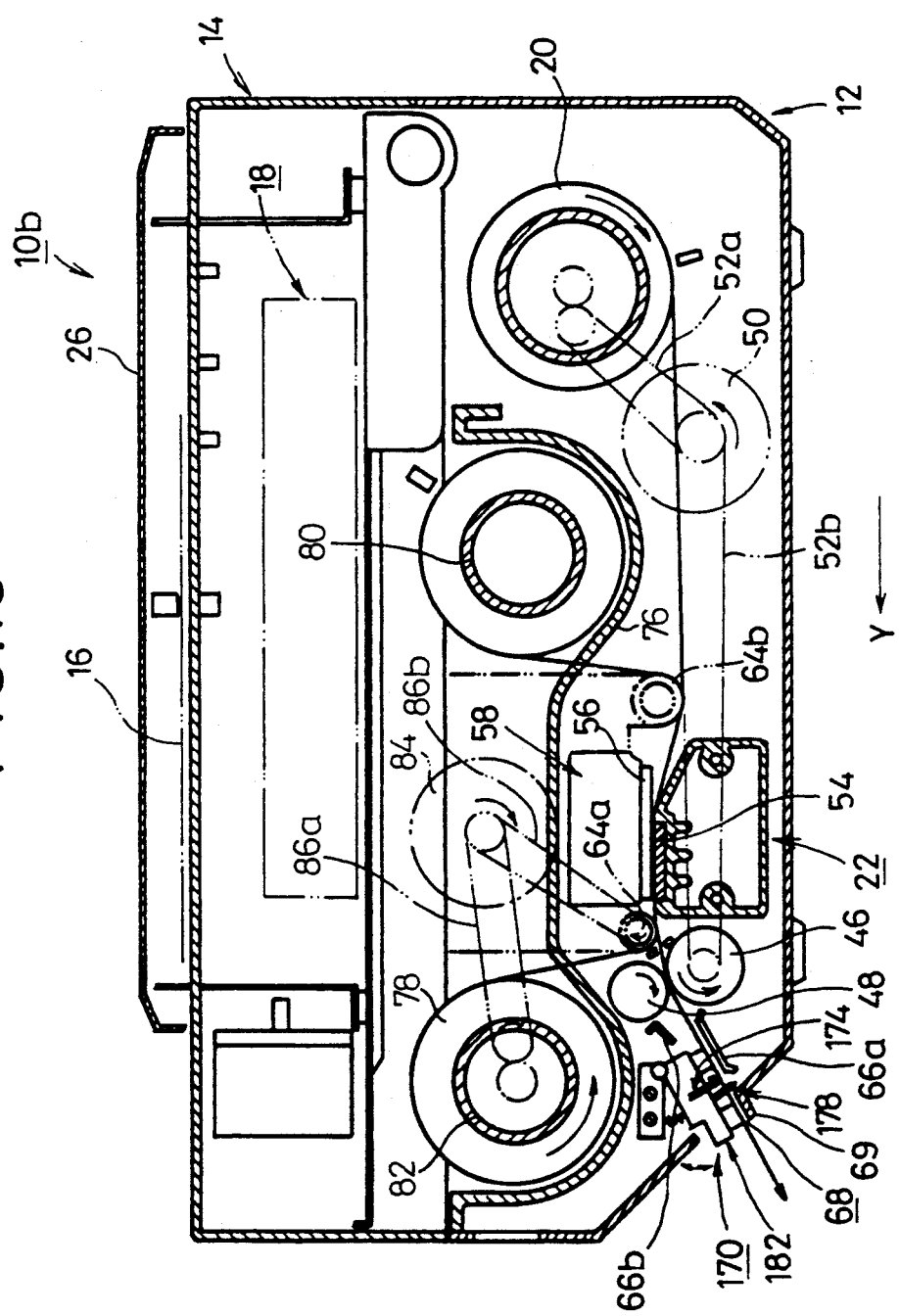
FIG. 13 is a vertical cross-sectional view of the information reading and recording apparatus shown in FIG. 12.

As shown in FIGS. 12 and 13, the information reading and recording apparatus, generally designated by the reference numeral 10b, is similar to the information reading and recording apparatus 10 shown in FIGS. 3 and 4, except for a sheet cutter mechanism 170 for cutting off a recording sheet 20.

The sheet cutter mechanism 170 is movably disposed on a guide 69 which defines the discharge slot 68 in the lower cover 12.

Figure 14:
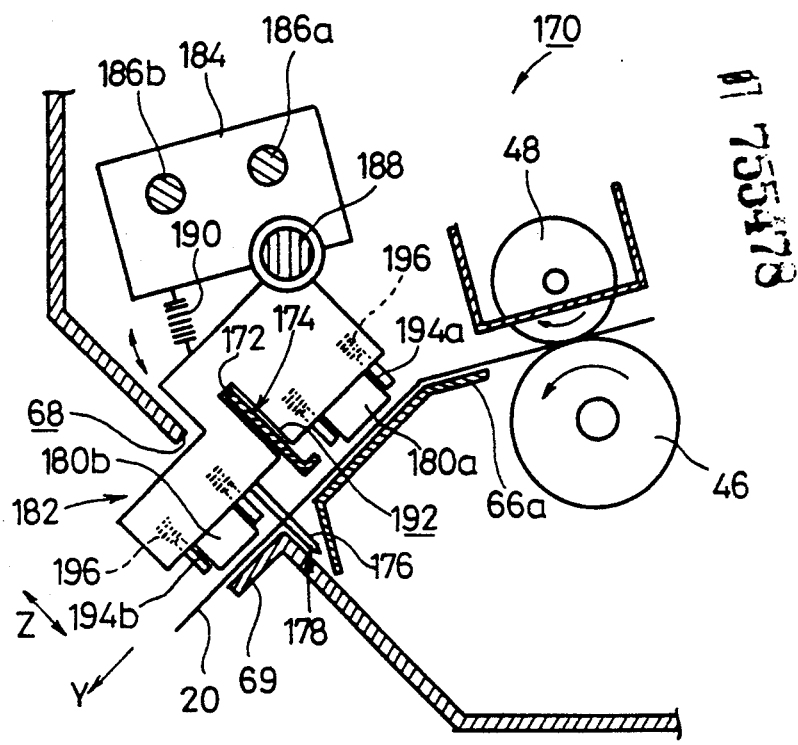
FIG. 14 is an enlarged vertical cross-sectional view of a sheet cutter mechanism in the information reading and recording apparatus shown in FIG. 12.
Figure 15:
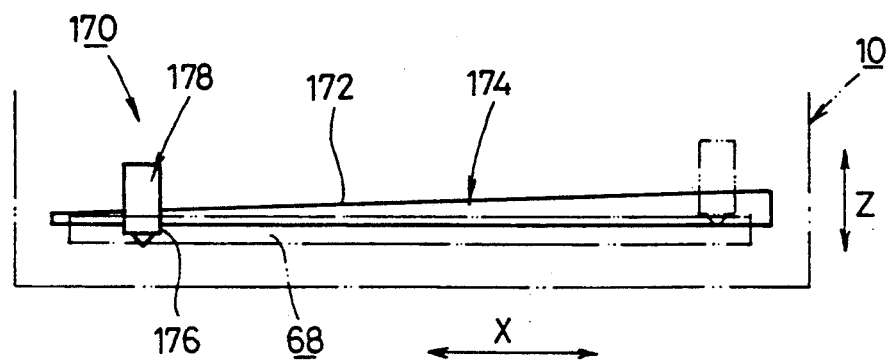
FIG. 15 is a view illustrative of the manner in which the sheet cutter mechanism shown in FIG. 14 operates.

As shown in FIGS. 14 and 15, the sheet cutter mechanism 170 has a rail 174 extending in the direction X transverse to the direction Y along which the recording sheet 20 is fed, the rail 174 having an upper guide surface 172 that is inclined from one end to the other end thereof. In FIG. 14, the recording sheet 20 is fed on the guide plate 66a, and the rail 174 is positioned upwardly of the guide plate 66a. The sheet cutter mechanism 170 also has a cutter 178 that can be guided by the guide surface 172 for movement in a direction indicated by the arrow Z which is traverse to the direction X while the cutter 178 is cutting off the recording sheet 20 in its movement in the direction X, and a pair of rollers 180a, 180b for holding the recording sheet 20 while it is being cut off by the cutter 178. The cutter 178 has a cutting edge on its tip.

The cutter 178 is fixedly mounted on a swingable holder 182 that is supported on a slide base 184. The slide base 184 is supported on a pair of parallel guide bars 186a, 186b extending in the direction X. The swingable holder 182 is pivotally supported on the slide base 184 by a pivot 188. The swingable holder 182 is normally urged to swing away from the recording sheet 20 on the guide plate 66a under a spring 190 that is joined between the swingable holder 182 and the slide base 184.

The swingable holder 182 has one end projecting out of the discharge slot 68, and has a slot 182 defined therein and opening downwardly toward the guide plate 66a. The rail 174 is received in the slot 182. The cutter 178 is fixed to the swingable holder 182 and extends immediately behind the discharge slot 68 between the guide 69 and the guide plate 66a. The rollers 180a, 180b are rotatably supported on the swingable holder 182 one on each side of the cutter 178 and the rail 174, the rollers 180a, 180b projecting toward the guide 69 and the guide plate 66a, respectively. The rollers 180a, 180b have respective shafts 194a, 194b each having opposite ends that are engaged by springs 196. The springs 196 normally bias the shafts 194a, 194b to resiliently urge the rollers 180a, 180b toward the recording sheet 20.

The information reading and recording apparatus 10b operates as follows:

The reading unit 18 and the recording unit 22 operate in the same manner as those of the information reading and recording apparatus 10, 10a according to the first and second embodiments of the present invention. Therefore, only operation of the sheet cutter mechanism 170 will be described in detail below.

The recording sheet 20 on which the desired information has been recorded is discharged between the guide plates 66a, 66b out of the discharge slot 68 by the feed roller 46 and the nip roller 48. When the desired length of the recording sheet 20 is discharged out of the discharge slot 68, the operator manually actuates the sheet cutter mechanism 170.

Specifically, the operator pushes swingable holder 182 toward the recording sheet 20 about the pivot 188 against the bias of the spring 190. The rollers 180a, 180b now press the recording sheet 20 against the guide plate 66a and the guide 69, respectively, against the resiliency of the springs 196. At this time, the cutter 178 is displaced across the recording sheet 20.

Then, the operator moves the swingable holder 182 along the discharge slot 68 in the direction X while the swingable holder 182 is being guided by the rail 174. The cutter 178 also moves with the swingable holder 182, cutting off the recording sheet 20 from one side to the other with the cutting edge 176.

Since the guide surface 172 of the rail 174 is inclined from one side to the other thereof, the cutter 178 that is guided by the guide surface 172 moves in the direction Z as it moves in the direction X (see FIG. 15). Therefore, the cutting edge 176 of the cutter 178 is also displaced in the direction Z while cutting off the recording sheet 20. The cutting edge 176 is thus prevented from being kept at one point in contact with the recording sheet 20, but the point of contact between the cutting edge 176 and the recording sheet 20 constantly varies while the cutting held is being held in cutting engagement with the recording sheet 20. In each cutting stroke of the cutter 178, the wear of the cutting edge 176 that is caused by cutting contact with the recording sheet 20 is distributed over the cutting edge 176. The cutting edge 176 is effectively prevented from being worn or damaged soon, and can be used over a long period of time, i.e., the durability of the cutter 178 is increased.

When the cutter 178 cuts off the recording sheet 20, the recording sheet 20 is pressed by the rollers 180a, 180b on the opposite sides of the cutter 178. Consequently, the recording sheet 20 can accurately and reliably be cut off by the cutter 178 as the recording sheet 20 is securely held in position while being severed. Since the rollers 180a, 180b are resiliently pressed against the recording sheet 20 by the springs 196, the rollers 180a, 180b securely hold the recording sheet 20 in position even when the swingable holder 182 moves in the direction Z as it moves along the rail 174.

After the recording sheet 20 has been cut off, the operator releases the swingable holder 182, which is angularly moved upwardly about the pivot 188 under the tension of the spring 190. The rollers 180a, 180b and the cutter 178 are now spaced from the recording sheet 20.

The information reading and recording apparatus according to the above embodiments of the present invention offer the following advantages:

Since the reading unit and the recording unit are disposed in upper and lower positions, respectively, the full length of the information reading and recording apparatus is minimized even when a recording sheet of a large size is used. The direction in which the document to be copied is fed and the direction in which the recording sheet is fed extend across each other. Therefore, the document can be fed horizontally highly accurately for efficient reading operation and effective recording operation.

The document can automatically be fed in the auxiliary scanning direction so that it can be read in a reading cycle, and also in the reverse direction so that it can be brought back into a position to start the reading cycle again. Accordingly, once the document to be copied is placed on the information reading and recording apparatus, it can be read successively as many times as desired without any positional misalignments, and the information borne by the document can be recorded on as many recording sheets as desired. Consequently, the reading cycle and the recording cycle can automatically be effected efficiently.

The desired information can be read from an area of the document whose width is 1/N of the entire width N of the document, and the read information can be increased for enlargement. Such a reading cycle is repeated N times while reciprocally feeding the document N times, and the successively read information which is enlarged is recorded on the recording sheet at successive N areas. The recorded areas on the recording sheet are subsequently cut off and joined side by side, thus producing a sheet with the enlarged information recorded thereon. The document which is discharged from the reading unit in each reading cycle is not required to be manually inserted into the reading unit by the operator because the document is automatically fed into the reading unit for as many reading cycles as desired. The document is prevented from being set again erroneously in the reading unit by the operator, and any failure to properly join the recorded areas of the recording sheet due to such an erroneous setting of the document is also prevented from happening.

When the cutter is moved along the rail transverse to the direction in which the recording sheet is fed, the cutting edge of the cutter is guided by the guide surface of the rail to move in a direction transverse to the direction in which the cutter cuts off the recording sheet. Therefore, the cutting edge is prevented from being kept at one point in cutting contact with the recording sheet. The cutter is thus made more wear-resistant and highly durable in use. For this reason, the sheet cutter mechanism is capable of cutting off the recording sheet efficiently and smoothly.

Although certain preferred embodiments of the present invention have been shown and described in detail, it should be understood that various changes and modifications may be made therein without departing from the scope of the appended claims.

What is claimed is:

1. An apparatus for reading and recording information, comprising:
   a reading unit for photoelectrically reading information from a document while the document is being horizontally fed in a first direction;
   a recording unit for recording the information read by said reading unit on a recording medium while the recording medium is being fed in a second direction; and
   said reading unit and said recording unit being disposed in upper and lower positions, respectively.

2. An apparatus according to claim 1, wherein said reading unit and said recording units are positioned relatively to each other such that said first and second directions extend across each other.

3. An apparatus according to claim 1, further including a lower cover and an upper cover openably and closably supported on said lower cover, said recording unit being housed in said lower cover and said reading unit being housed in said upper cover.

4. An apparatus according to claim 3, further including a donor film cassette detachably mounted in said lower cover downwardly of said reading unit.

5. An apparatus according to claim 1, wherein said reading unit comprises:
   feeding means for feeding the document reciprocally in said first direction; and
   detecting means for detecting leading and trailing ends of the document in said first direction.

6. An apparatus according to claim 5, wherein said feeding means has a horizontal feed path along which the document is reciprocally fed.

7. An apparatus according to claim 5, wherein said feeding means comprises a pair of roller pairs spaced from each other in said first direction.

8. An apparatus according to claim 1, wherein said reading means comprises:
   feeding means for feeding the document reciprocally in said first direction; and
   detecting means for detecting a leading or trailing end of the document in said first direction.

9. An apparatus according to claim 8, wherein said feeding means has a horizontal feed path along which the document is reciprocally fed.

10. An apparatus according to claim 8, wherein said feeing means comprises a pair of roller pairs spaced from each other in said first direction.

11. An apparatus according to claim 1, wherein said reading unit comprises means for successively scanning N (N is an integer of 2 or more) areas of the document which are divided in a direction in which the document is width that is equal to at least 1/N of the width N of the document, while the document is reciprocally fed N times, and for photoelectrically reading information from the scanned areas, further including enlarging means for successively enlarging the information read from said N areas of the document by said reading unit, said recording unit comprising means for recording the enlarged information on the recording medium successively at N areas thereof which are divided in said second direction.

12. An apparatus according to claim 1, further including a cutter mechanism for cutting off the recording medium, said cutter mechanism comprising:
   a guide surface extending across said second direction and inclined from one end to the other end thereof;
   a cutter having a cutting edge, said cutter being guidable by said guide surface to cause said cutting edge to move across said second direction for cutting off the recording medium; and
   holding means for holding the recording medium in position while said cutting edge is cutting off the recording medium.

13. An apparatus according to claim 12, wherein said cutter mechanism includes a slide base movable across said second direction, said cutter being swingably supported on said slide base, and resilient means for normally urging said cutter to move away from the recording medium.

14. An apparatus according to claim 12, wherein said cutter mechanism includes a swingable holder, said cutter being fixed to said swingable holder, said holding means comprises a pair of rollers rotatably supported on said swingable holder, said rollers being positioned one on each side of said cutter.

15. An apparatus according to claim 14, wherein said cutter mechanism includes resilient means for normally urging said rollers toward the recording medium.

* * * * *